Sept. 21, 1943.　　　E. P. LAMB ET AL　　　2,329,916
VEHICLE DRIVING MEANS
Filed Nov. 15, 1940　　　3 Sheets-Sheet 1
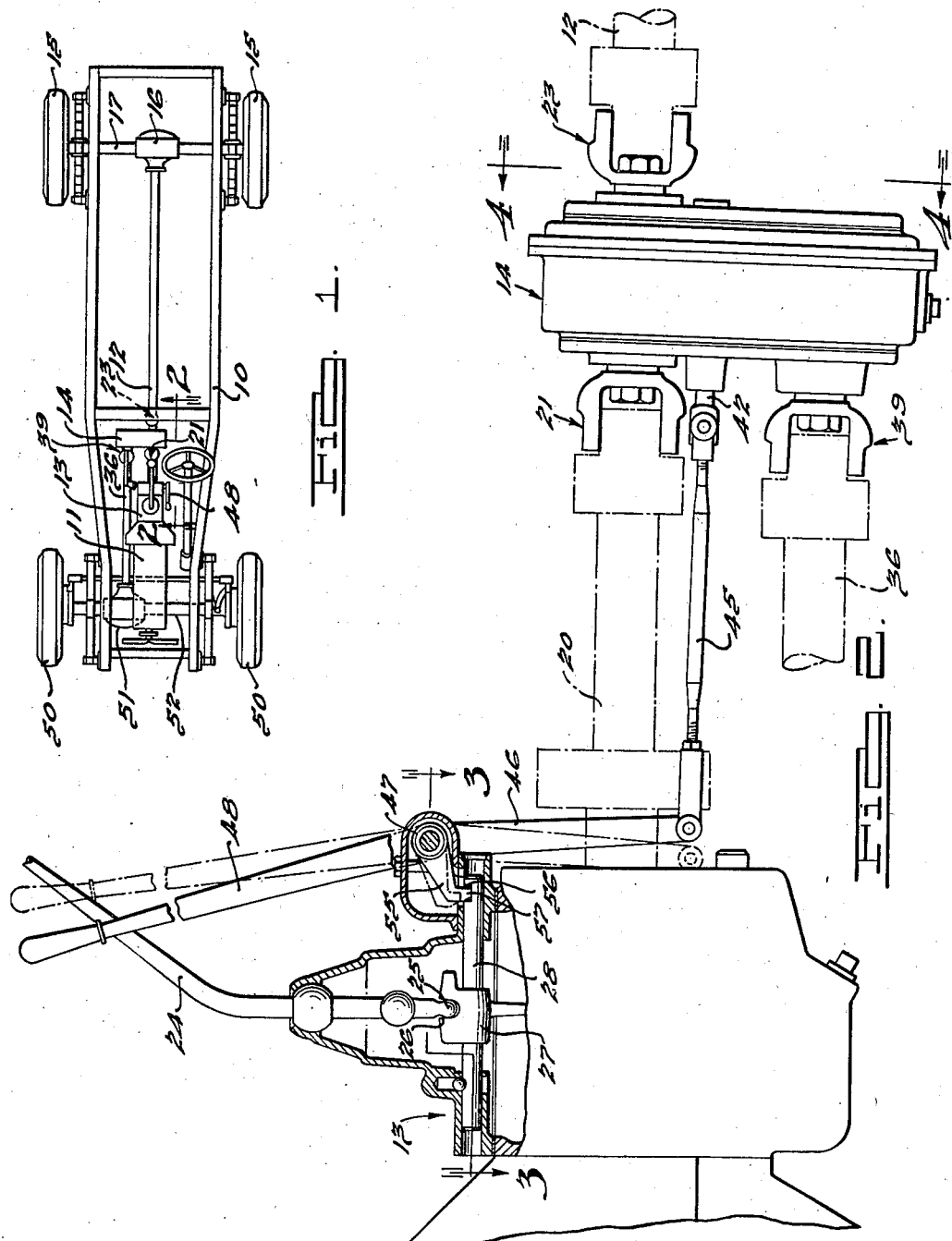
INVENTORS
ERNEST P. LAMB
ROBERT H. DUFF AND
WALTER F. PLOETZ.
BY Harness, Lind, Patee & Harris
ATTORNEYS.

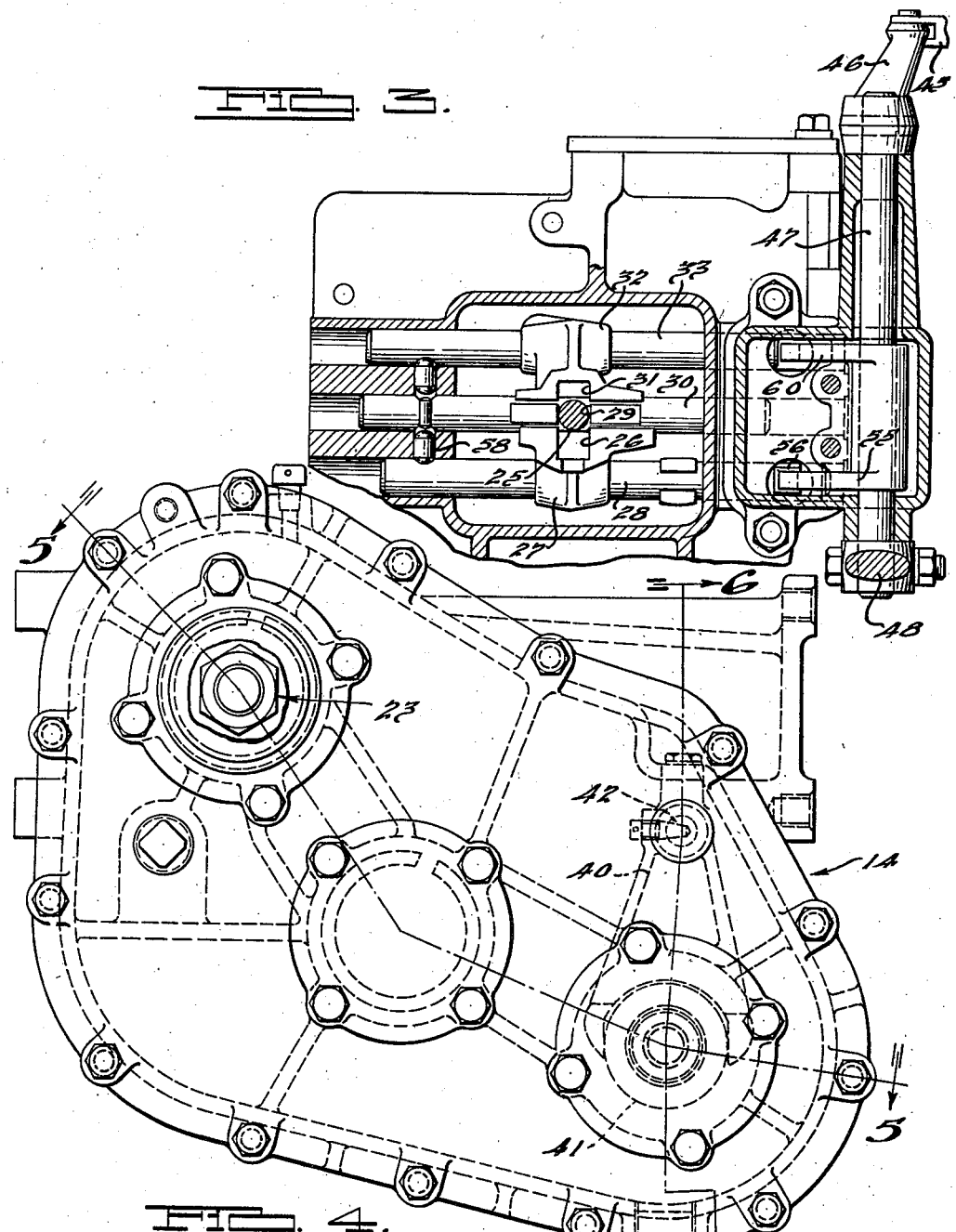

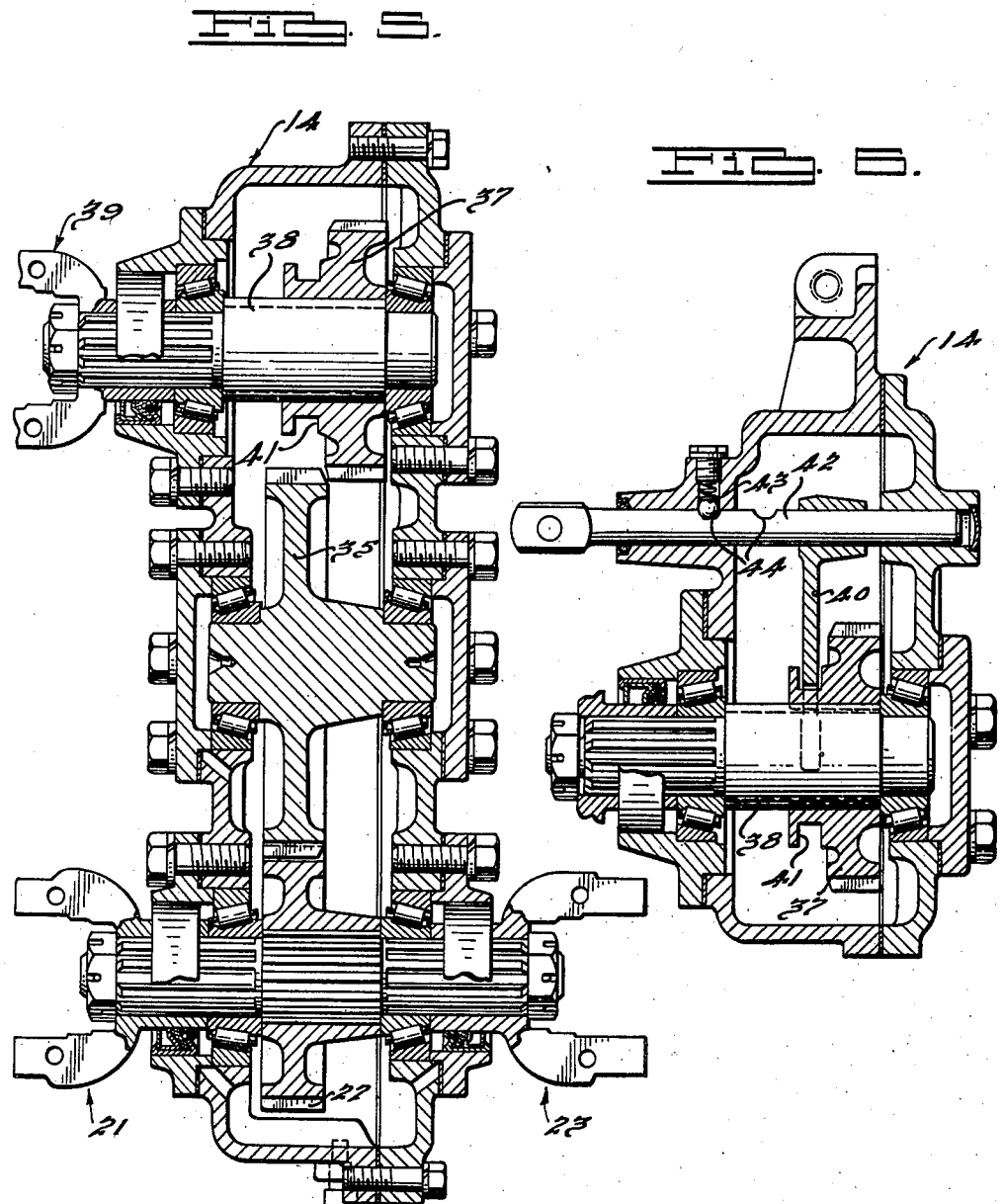

Patented Sept. 21, 1943

2,329,916

UNITED STATES PATENT OFFICE 2,329,916

VEHICLE DRIVING MEANS

Ernest P. Lamb, Robert H. Duff, and Walter F. Ploetz, Detroit, Mich., assignors to Chrysler Corporation, Highland Park, Mich., a corporation of Delaware Application November 15, 1940, Serial No. 365,726

16 Claims. (Cl. 180—44)

The present invention relates to the driving means for a four-wheel drive automotive vehicle. The improvement is concerned with a four-wheel drive mechanism having provision whereby a pair of the four wheels may be rendered operative or inoperative, as desired. In such a mechanism it is possible to have the vehicle driven by all four wheels, or by a pair of the wheels alone, preferably the rear wheels which may be driven through the normal driving means. It is an object of the present invention to prevent operation of the vehicle as a two-wheel driven vehicle when in a low gear ratio or in reverse.

A four-wheel drive is of particular use in connection with trucks which may be heavily loaded or in vehicles designed to traverse exceedingly rough terrain. When the terrain is very rough and particularly if the ground is soft and slippery, the driver of the vehicle sometimes finds it necessary to rock the vehicle to and fro by rapidly shifting from low or first speed forward into reverse so as to move the vehicle from a place in which it may be temporarily stalled. In a vehicle designed for four-wheel driving, an undue strain is placed upon the driving mechanism if a pair of the wheels is not used for driving purposes, especially under such difficult conditions of use as mentioned above; whereas, it may be perfectly permissible and might result in better operation if a pair of wheels is not used for driving purposes when the ground is smooth and firm and the vehicle is progressing easily or is lightly loaded. In order to prevent the use of the vehicle as a normally driven vehicle, or to assure its use as a four-wheel driven vehicle when starting or under difficult conditions, the present invention is designed to make it impossible for the vehicle to be used in first or second speeds forward or in reverse other than as a four-wheel driven vehicle.

An object of the present invention is to provide means to prevent shifting the transmission gearing into low or reverse unless the selective driving pair of wheels is in driving condition. A further object of the present invention is to provide such means in a simple mechanism requiring but few rugged parts which may be installed in connection with existing four-wheel driving mechanisms, which parts are of rugged character and not likely to fail under hard usage.

The objects and advantages of the present invention should be more readily apparent from a study of the following specification taken in connection with the accompanying drawings wherein like numerals refer to like parts throughout.

In the drawings,

Fig. 1 is a plan view of the chassis of a four-wheel drive vehicle having the present invention applied thereto;

Fig. 2 is a view in elevation of the transmission of the vehicle taken on an enlarged scale along line 2—2 of Fig. 1, with parts cut away in order to show the application of the present invention;

Fig. 3 is a horizontal section taken substantially along line 3—3 of Fig. 2, showing details of the means for locking the transmission out of low or reverse gear unless the selective driving wheels are in driving condition;

Fig. 4 is a vertical section taken substantially along line 4—4 of Fig. 2, showing details of the selective driving gear case;

Fig. 5 is a sectional view taken substantially along line 5—5 of Fig. 4, showing details of the selective driving gearing; and, Fig. 6 is a section taken substantially along line 6—6 of Fig. 4, showing the means for selecting the optional driving wheels.

The vehicle comprises a frame 10 on which is mounted a motor 11 driving a normal propeller shaft 12 through a transmission 13 and selective driving gear housing 14. The propeller shaft 12 drives a pair of rear wheels 15 through the medium of a differential mechanism 16 and rear axle 17 of any normal construction, the pair of rear wheels 15 thus constituting a normal driving means. As seen in Figs. 2, 4, and 5, the transmission 13 is connected to the propeller shaft 12 through a shaft 20, universal joint 21, the shaft of driving gear 22 in the casing 14, and universal joint 23. The gear 22 is thus always rotated as long as the transmission 13 is in driving engagement as controlled by the gear shift lever 24.

The ratio of power transmission and direction of rotation of the driving gear 22, and consequently of the propeller shaft 12 and wheels 15, are under control of the transmission gear shifting device, including the gear shift lever 24 which is provided with a rounded end 25 engageable in a slot 26 in member 27 fastened to shifter rail 28 which controls first and second speeds forward, or in a slot 29 between raised projections on a shifter rail 30 which controls third and fourth speeds forward, or in a slot 31 in a member 32 fastened to shifter rail 33 which controls the reverse gearing. The rails 28, 30, and 33 move longitudinally through guide holes in the portion of the transmission casing in which they are mounted.

In order to provide means for driving the vehicle as a four-wheel drive vehicle, there is provided an idler gear 35 mounted in the casing 14 in position to be constantly in mesh with the driving gear 22. Gear 35 is adapted to drive a front wheel driving shaft 36 through the medium of a selective gear 37 splined onto a stub shaft 38 which is connected to shaft 36 through a universal joint 39. The gear 37 is shiftable longitudinally of shaft 38 into and out of meshing engagement with gear 35 by a shifting yoke 40 straddling an annular groove 41 in the hub of gear 37. The yoke 40 is fastened to a selector rod 42 which is slidably mounted in the casing 14 and which is adapted to be retained in position to mesh the gears or to hold them out of mesh by a spring-pressed ball 43 engageable in notches 44 therein. The rod 42 is pivotally connected to a link 45 extending to a lever 46 fastened to a rock shaft 47 mounted in proximity to the transmission shifter rails, to the opposite end of which is fixed a selecting lever 48 extending upward to within reach of the driver of the vehicle. When the lever 48 is pulled rearwardly into the position shown in skeleton outline in Fig. 2, link 45 is pulled forward and causes engagement of selector gear 37 with the idling gear 35. Thereupon, the pair of front wheels 50 acts as driving wheels through the medium of the drive shaft 36, front wheel differential 51, and front wheel axle 52. When the lever 48 is shifted into the position shown in full outline in Fig. 2, the selective gear is disengaged and the vehicle is converted into a normal drive vehicle driven by power transmitted through the rear wheels 15 alone.

In order to prevent starting of the vehicle as a normal drive vehicle, or to make certain that it will be driven in low gear solely as a four-wheel drive vehicle, there is provided a pawl 55 which is fixed to the rock shaft 47 at a point above the low gear shifter rail 28. The shifter rail is provided with a notch 56 and the pawl 55 is provided with a detent end 57 shaped to engage in the notch 56 when lever 48 is moved to gear disengaging position and shifter rail 28 is in inoperative or central position where it would be retained by the retainer button 58 when shifter rail 30 has been moved into third or fourth speed engaging position. If the vehicle has slowed down to a speed such that shifting into second gear or first gear is possible, such shifting will be prevented unless the selective front wheel drive is in operation since the pawl 55 will be engaged in notch 56 of shifter rail 28 and will prevent movement of the shifter rail until lever 48 has been moved into the position where selector gear 37 is in driving engagement. Also, if the vehicle is progressing in first or second gear forward, the operator cannot disengage the front wheel drive since the pawl 55 will be in position to strike the top of shifter rail 28 and lever 48 will be prevented from moving to disengage the front wheel drive.

In order to prevent use of the vehicle in reverse as a normal two-wheel drive vehicle, there is provided a second pawl 60 which is adapted to engage the rear end of shifter rail 33 and prevent movement of that rail into reverse gear engaging position unless lever 48 has been so moved as to cause engagement of the selector gear 37, and when in reverse the selector gear may not be disengaged because pawl 60 would strike the upper surface of shifter rail 33 before lever 48 could be moved into disengaging position.

It is, of course, apparent that the pawl 55 may be used alone or that the pawl 60 may be used alone, but it is also equally apparent that the two in combination protect the vehicle from the heaviest shocks and strains to which it might be subjected by a ruthless driver in rough terrain. It is also apparent that the number and shape of the pawls may be altered to prevent the use of the vehicle as a normal two-wheel driven vehicle under other conditions, such as when the vehicle is in first speed forward alone, or in third speed forward in addition to first and second.

Having illustrated and described a preferred embodiment of the present invention, it should be readily apparent to those skilled in the art that the same permits of modifications in arrangement and details. All such modifications as come within the scope of the following claims are to be considered a part of our invention.

We claim:

1. In an automotive vehicle having two driving axles, a driving motor, a power transmitting assembly for transmitting motive power from said motor normally to only one of said driving axles including a transmission device having several forward gear trains of various ratios and a reversing gear train, gear train selecting means including a first manual lever for placing one or another of said gear trains in axle driving engagement, means including said transmission device and a disengageable power transmitting mechanism for selectively transmitting motive power from said motor to the other of said driving axles in addition to the one normally driven, means including a second manual lever for engaging or disengaging said disengageable power transmitting mechanism, and means operatively connected to said second manual lever for preventing selective engagement of certain of said gear trains by movement of said first manual lever when said disengageable power transmitting mechanism has been disengaged by said second manual lever.

2. In an automotive vehicle having two driving axles, a driving motor, a power transmitting assembly for transmitting motive power from said motor normally to only one of said driving axles including a transmission device having several forward gear trains of various ratios and a reversing gear train, gear train selecting means including a first manual lever for placing one or another of said gear trains in axle driving engagement, means including said transmission device and a disengageable power transmitting mechanism for selectively transmitting motive power from said motor to the other of said driving axles in addition to the one normally driven, means including a second manual lever for engaging or disengaging said disengageable power transmitting mechanism, and means operatively connected to said second manual lever for preventing selective engagement of the lowermost ratio forward gear train by movement of said first manual lever when said disengageable power transmitting mechanism has been disengaged by said second manual lever.

3. In an automotive vehicle having two driving axles, a driving motor, a power transmitting assembly for transmitting motive power from said motor normally to only one of said driving axles including a transmission device having several forward gear trains of various ratios and a reversing gear train, gear train selecting means including a first manual lever for placing one or another of said gear trains in axle driving engagement, means including said transmission device and a disengageable power transmitting mechanism for selectively transmitting motive power from said motor to the other of said driving axles in addition to the one normally driven, means including a second manual lever for engaging or disengaging said disengageable power transmitting mechanism, and means operatively connected to said second manual lever for preventing selective engagement of one of the lower ratio forward gear trains by movement of said first manual lever when said disengageable power transmitting mechanism has been disengaged by said second manual lever.

4. In an automotive vehicle having two driving axles, a driving motor, a power transmitting assembly for transmitting motive power from said motor normally to only one of said driving axles including a transmission device having several forward gear trains of various ratios and a reversing gear train, gear train selecting means including a first manual lever for placing one or another of said gear trains in axle driving engagement, means including said transmission device and a disengagable power transmitting mechanism for selectively transmitting motive power from said motor to the other of said driving axles in addition to the one normally driven, means including a second manual lever for engaging or disengaging said disengageable power transmitting mechanism, and means operatively connected to said second manual lever for preventing selective engagement of said reversing gear train by movement of said first manual lever when said disengageable power transmitting mechanism has been disengaged by said second manual lever.

5. In an automotive vehicle having two driving axles, a driving motor, a power transmitting assembly for transmitting motive power from said motor normally to only one of said driving axles including a transmission device having several forward gear trains of various ratios and a reversing gear train, gear train selecting means including a first manual lever for placing one or another of said gear trains in axle driving engagement, means including said transmission device and a disengageable power transmitting mechanism for selectively transmitting motive power from said motor to the other of said driving axles in addition to the one normally driven, means including a second manual lever for engaging or disengaging said disengageable power transmitting mechanism, and means operatively connected to said second manual lever for preventing disengagement of said disengageable power transmitting mechanism by movement of said second manual lever while a certain one of said gear trains is in driving engagement.

6. In an automotive vehicle having two driving axles, a driving motor, a power transmitting assembly for transmitting motive power from said motor normally to only one of said driving axles including a transmission device having several forward gear trains of various ratios and a reversing gear train, gear train selecting means including a first manual lever for placing one or another of said gear trains in axle driving engagement, means including said transmission device and a disengageable power transmitting mechanism for selectively transmitting motive power from said motor to the other of said driving axles in addition to the one normally driven, means including a second manual lever for engaging or disengaging said disengageable power transmitting mechanism, and means operatively connected to said second manual lever for preventing disengagement of said disengageable power transmitting mechanism by movement of said second manual lever while the lowermost ratio forward gear train is in driving engagement.

7. In an automotive vehicle having two driving axles, a driving motor, a power transmitting assembly for transmitting motive power from said motor normally to only one of said driving axles including a transmission device having several forward gear trains of various ratios and a reversing gear train, gear train selecting means including a first manual lever for placing one or another of said gear trains in axle driving engagement, means including said transmission device and a disengagable power transmitting mechanism for selectively transmitting motive power from said motor to the other of said driving axles in addition to the one normally driven, means including a second manual lever for engaging or disengaging said disengageable power transmitting mechanism, and means operatively connected to said second manual lever for preventing selective disengagement of said disengageable power transmitting mechanism by movement of said second manual lever while one or another of the lower ratio forward gear trains is in driving engagement.

8. In an automotive vehicle having two driving axles, a driving motor, a power transmitting assembly for transmitting motive power from said motor normally to only one of said driving axles including a transmission device having several forward gear trains of various ratios and a reversing gear train, gear train selecting means including a first manual lever for placing one or another of said gear trains in axle driving engagement, means including said transmission device and a disengageable power transmitting mechanism for selectively transmitting motive power from said motor to the other of said driving axles in addition to the one normally driven, means including a second manual lever for engaging or disengaging said disengageable power transmitting mechanism, and means operatively connected to said second manual lever for preventing selective disengagement of said disengageable power transmitting mechanism by movement of said second manual lever while said reversing gear train is in driving engagement.

9. In an automotive vehicle having a normal rear wheel drive including a selective gear train transmission and a manually operable transmission gear train selecting lever, a front wheel drive capable of being placed in driving engagement in addition to said normal rear wheel drive, means to disengage said front wheel drive including a second manually operable lever, and means to prevent operation of said gear train selecting lever to cause operation of said normal rear wheel drive at low transmission gear ratios when said front wheel drive has been disengaged by operation of said second lever.

10. In an automotive vehicle having a normal rear wheel drive including a selective gear train transmission and a manually operable transmission gear train selecting lever, a front wheel drive capable of being placed in driving engagement in addition to said normal rear wheel drive, means to disengage said front wheel drive including a second manually operable lever, and means to prevent operation of said gear train selecting lever to cause operation of said normal rear wheel drive at its lowest gear ratio when said front wheel drive has been disengaged by operation of said second lever.

11. In an automotive vehicle having a normal rear wheel drive including a selective gear train transmission and a manually operable transmission gear train selecting lever, a front wheel drive capable of being placed in driving engagement in addition to said normal rear wheel drive, means to disengage said front wheel drive including a second manually operable lever, and means to prevent operation of said gear train selecting lever to cause operation of said normal rear wheel drive through one or more of the selective gear trains in the transmission when said front wheel drive has been disengaged by operation of said second lever.

12. In an automotive vehicle having a normal rear wheel drive including a selective gear train transmission and a manually operable transmission gear train selecting lever, a front wheel drive capable of being placed in driving engagement in addition to said normal rear wheel drive, means to disengage said front wheel drive including a second manually operable lever, and means to prevent operation of said gear train selecting lever to cause operation of said normal rear wheel drive through the reversing gear train when said front wheel drive has been disengaged by operation of said second lever.

13. In an automotive vehicle having a normal rear wheel drive including a selective gear train transmission and a manually operable transmission gear train selecting lever, a front wheel drive capable of being placed in driving engagement in addition to said normal rear wheel drive, means to disengage said front wheel drive including a second manually operable lever, and means to prevent movement of said second manually operable lever to cause disengagement of said front wheel drive disengaging means while the vehicle is being driven at low transmission gear ratios.

14. In an automotive vehicle having a normal rear wheel drive including a selective gear train transmission and a manually operable transmission gear train selecting lever, a front wheel drive capable of being placed in driving engagement in addition to said normal rear wheel drive, means to disengage said front wheel drive including a second manually operable lever, and means to prevent movement of said second manually operable lever to cause disengagement of said front wheel drive disengaging means while the vehicle is being driven at its lowest gear ratio.

15. In an automotive vehicle having a normal rear wheel drive including a selective gear train transmission and a manually operable transmission gear train selecting lever, a front wheel drive capable of being placed in driving engagement in addition to said normal rear wheel drive, means to disengage said front wheel drive including a second manually operable lever, and means to prevent movement of said second manually operable lever to cause disengagement of said front wheel drive disengaging means while the vehicle is being driven through one or more of the selective gear trains in the transmission.

16. In an automotive vehicle having a normal rear wheel drive including a selective gear train transmission and a manually operable transmission gear train selecting lever, a front wheel drive capable of being placed in driving engagement in addition to said normal rear wheel drive, means to disengage said front wheel drive including a second manually operable lever, and means to prevent movement of said second manually operable lever to cause disengagement of said front wheel drive disengaging means while the vehicle is being driven through the reversing gear train.

ERNEST P. LAMB.
ROBERT H. DUFF.
WALTER F. PLOETZ.